UNITED STATES PATENT OFFICE.

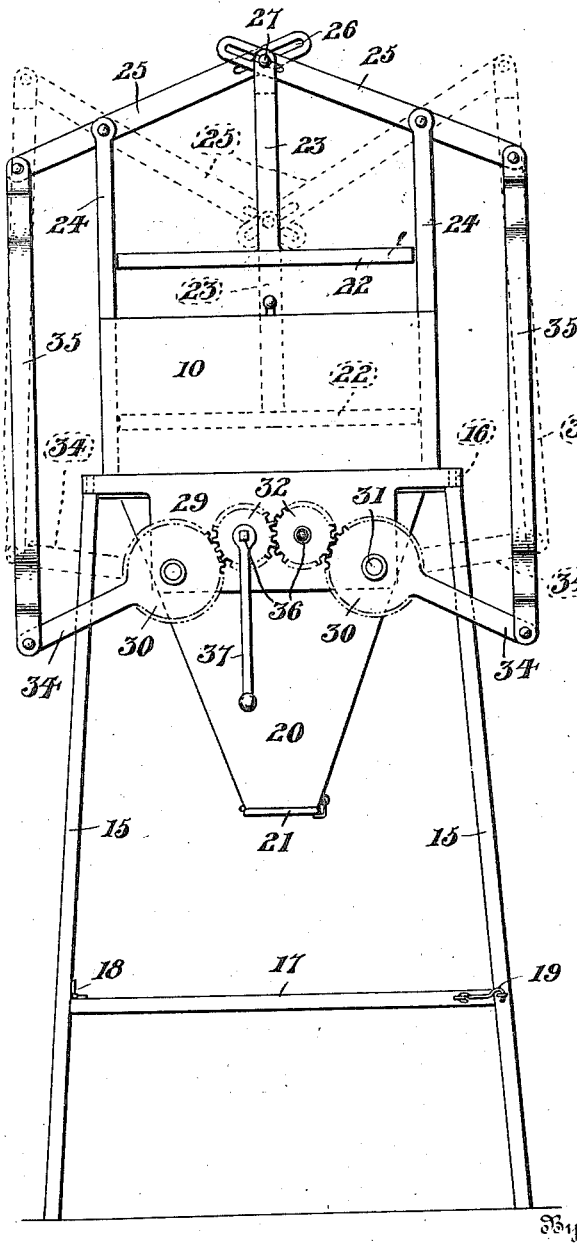
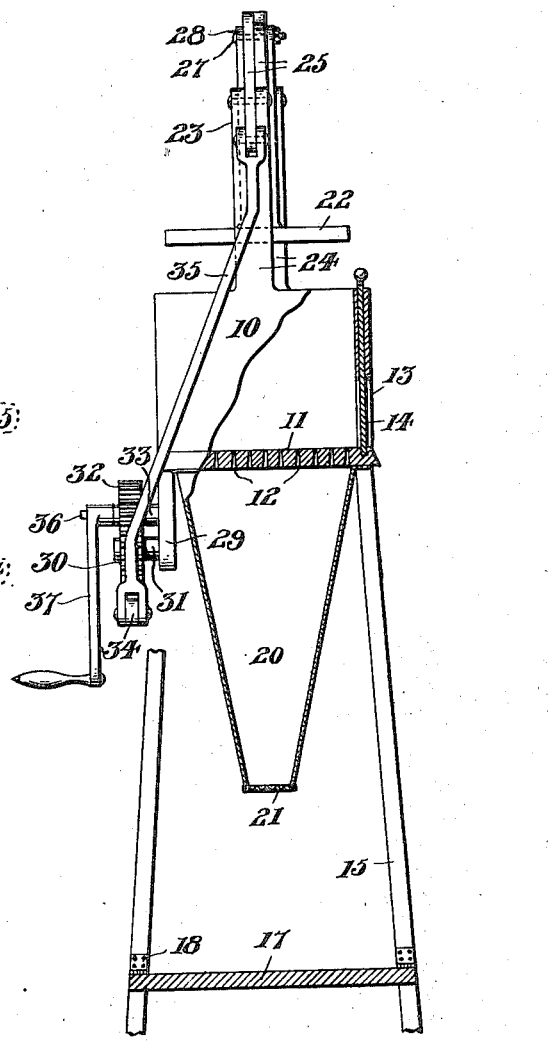

PAUL BINÓ, OF WEIRTON, WEST VIRGINIA.

HOUSEHOLD-PRESS.

1,186,735.	Specification of Letters Patent.	Patented June 13, 1916.

Application filed November 11, 1915. Serial No. 60,940.

*To all whom it may concern:*

Be it known that I, PAUL BINÓ, a subject of the King of Hungary, residing at Weirton, in the county of Hancock and State of West Virginia, have invented certain new and useful Improvements in Household-Presses, of which the following is a specification.

This invention relates to certain new and useful improvements in household presses.

The primary object of the invention is the provision of a hand-operated press especially adapted for household use in extracting juices from fruits and vegetables.

A further object of the invention is to provide a press that possesses extreme strength in extraction of juices and so arranged that the separate members thereof may be readily cleaned when desired, a straining means being also provided for the extracted fluid.

A still further object of the invention is the provision of a crank operated dasher for a fruit press, the same being capable of exerting the desired degree of pressure upon the goods operated upon.

With these general objects in view and others that will appear as the nature of the invention is better understood, the same consists in the novel combination and arrangement of parts hereinafter more fully described, illustrated in the accompanying drawings, and pointed out in the appended claim.

In the drawings forming a part of this application and in which like-designating characters refer to corresponding parts throughout the several views: Figure 1 is a front elevation of the device, the same being illustrated by dotted lines in its operative position, and Fig. 2 is a side elevation thereof, partly in vertical section.

The present invention as herein illustrated comprises a receiving receptacle 10 for the fruit or other articles to be pressed, the same being of box-shaped formation having the bottom 11 thereof provided with a plurality of perforations 12 designed as outlets for the fluid and being outwardly and downwardly flared.

The receptacle 10 is provided with a side door or opening 13 for extracting the pulp after the operation of the press, the said opening being provided with a closure slide 14.

The receptacle 10 is mounted upon four supporting legs 15 which are removably positioned in sockets 16 in the bottom 11. A shelf 17 is hinged as at 18 to two of the legs 15 and connected by means of hook and eye devices 19 with the opposite legs. An outlet funnel 20 is secured to the bottom 11 of the receptacle for receiving the juices passing through the perforations 12, while a hinged screen 21 is secured over the lower contracted open end of the said funnel, said lower end of the funnel being disposed centrally above the shelf 17. A reciprocating dasher 22 is provided for horizontal positioning within the receptacle 10, the same having an upwardly extending centrally arranged operating rod 23. Posts 24 extend upwardly from opposite sides of the receptacle 10 being slightly out of transverse alinement with each other and each having an operating lever 25 pivoted to the top thereof and provided with a slot 26 at its inner free end. The slotted ends of the levers 25 are arranged overlapping each other, while a pivot bolt 27 extends through the upper bifurcated end 28 of the rod 23 and through the slots 26, the inner ends of the levers 25 being positioned in the bifurcation of the said rod.

A plate 29 depends from the receptacle bottom 11 at one side thereof and is provided with gears 30 revolubly mounted upon stub shafts 31 carried by the said plate and suitably spaced apart for the reception of intermediately arranged pinions 32 carried by similar stub shafts 33 projecting from said plate, the said pinions 32 and gears 30 being in constant mesh with each other as best illustrated in Fig. 1 of the drawings. The gears 30 are provided with outwardly extending arms 34 and have their outer ends pivotally connected to the outer free ends of the levers 25 by means of angularly bent connecting links 35. The pinions 32 are provided with squared posts 36 adapted for the reception of a turn crank 37 which crank may be removably attached to the post of either of the pinions 32 as may be found desirable.

The complete operation of the device will be apparent from the present detailed description thereof, the fruit or vegetables to be pressed being placed within the receptacle 10 when the dasher 22 is elevated and by turning the crank 37, the pinions 32 will be operated for revolving the gears 30 and thereby swinging the arms 34 and elevating the links 35 and depressing the rod 23 and dasher 22 by means of the levers 25. The dasher 22 is thereby brought into crushing engagement with the contents of the receptacle 10, while added force imparted to the crank 37 forcibly depresses the dasher 22 for extracting the juices therefrom and forcing the same through the bottom perforations 12 into the funnel 20. The liquid then passes through the strainer 21 and is received into desired receptacles (not shown) placed upon the shelf 17.

While the form of the invention herein shown and described is what is believed to be the preferred embodiment thereof, it is nevertheless to be understood that minor changes may be made without departing from the spirit and scope of the invention as claimed.

What I claim as new is:—

A press comprising a receptacle having a perforated bottom, a support for the said receptacle, upright posts carried by the opposite sides of the said receptacle, levers pivoted in the tops of the said posts and having inner overlapping ends provided with longitudinal slots therein, a dasher for said receptacle and having a bifurcated operating rod, a pivot bolt arranged through the bifurcations of the said rod and through the slots in said levers positioned therebetween, and operating means connected to the outer free ends of the said levers.

In testimony whereof I affix my signature.

PAUL BINÓ

Witnesses:
JIM PATCHEBEY,
F. R. DICKSON.